(12) United States Patent
Chen et al.

(10) Patent No.: US 11,678,677 B2
(45) Date of Patent: Jun. 20, 2023

(54) METHOD FOR DECOLORIZATION AND DEODORIZATION OF EGG YOLK OIL

(71) Applicant: TAMKANG UNIVERSITY, New Taipei (TW)

(72) Inventors: Yau-Hung Chen, New Taipei (TW); Ming-Kai Chern, New Taipei (TW); Tung-Han Tsai, New Taipei (TW); I-Chang Liu, New Taipei (TW); Bo-Cheng Wang, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 449 days.

(21) Appl. No.: 16/898,480

(22) Filed: Jun. 11, 2020

(65) Prior Publication Data
US 2021/0195910 A1    Jul. 1, 2021

(30) Foreign Application Priority Data

Dec. 31, 2019 (TW) ................. 108148504

(51) Int. Cl.
  *A23D 7/04* (2006.01)
  *A23L 5/40* (2016.01)
  *A23L 15/00* (2016.01)
  *A23L 5/30* (2016.01)
  *A23L 5/20* (2016.01)

(52) U.S. Cl.
  CPC .............. *A23D 7/04* (2013.01); *A23L 5/273* (2016.08); *A23L 5/30* (2016.08); *A23L 5/40* (2016.08); *A23L 15/30* (2016.08); *A23V 2002/00* (2013.01)

(58) Field of Classification Search
  CPC ... A23D 7/04; A23L 5/273; A23L 5/30; A23L 5/40; A23L 15/30; A23V 2002/00; A23V 2200/046; A23V 2300/38; C11B 3/006; C11B 3/10; C11B 3/12; C11B 3/00
  USPC ...................................................... 426/268
  See application file for complete search history.

(56) References Cited

FOREIGN PATENT DOCUMENTS

RU    2634430 C1 * 10/2017
SU    1721080 A1 *  3/1992

OTHER PUBLICATIONS

NPL Wu et al. (in Molecules vol. 21, 106, 2016: Molecules 2016, 21, 106; doi:10.3390/molecules 21010106). (Year: 2016).*
NPL Master Chao et al. (2011: Egg yolk oil Recipe—Natural Farming Hawaii) (Year: 2011).*
NPL OFI magazine (2017) [Activated carbon is used in edible oil bleaching to remove . . . https://www.ofimagazine.com. news > Activated . . . ] (Year: 2017).*
NPL Larsen et al. (in Poultry Sci. 60: 160-167, 1980). (Year: 1980).*
NPL Footbalt et al. ( 2014, pp. 2, Chapter by Aleksandrs et al. 253-256] (Year: 2014).*
Google Search for NPL Footbalt (Retrieved on Oct. 21, 2022). (Year: 2022).*
Google Search for NPL OFI Magazine (Retrieved on Oct. 21, 2022). (Year: 2022).*
NPL "Activated Carbon Removal" [in Carbon filtration and activated charcoal | Experiment | RSC Education ; See last page—Year 2016]. (Year: 2016).*
Google search for NPL "Activated Carbon Removal" [Retrieved on Oct. 21, 2022]. (Year: 2022).*

* cited by examiner

*Primary Examiner* — Donald R Spamer
*Assistant Examiner* — Bhaskar Mukhopadhyay
(74) *Attorney, Agent, or Firm* — WPAT, P.C

(57) ABSTRACT

A method for decolorization and deodorization of egg yolk oil comprises at least: adding a first ether solution to a crude egg yolk oil, and performing a first stirring process, to produce a first egg yolk oil mixture; adding activated carbon to the first egg yolk oil mixture, performing a second stirring process, and removing the activated carbon, to produce a second egg yolk oil mixture; adding a second ether solution and distilled water to the second egg yolk oil mixture, and performing a third stirring process, to produce a third egg yolk oil mixture; and removing distilled water, part of the first ether solution, and part of the second ether solution from the third egg yolk oil mixture by a distillation process, and removing the remaining first ether solution and the remaining second ether solution by a vacuum process to produce a decolorized and deodorized egg yolk oil.

11 Claims, 8 Drawing Sheets

METHOD FOR DECOLORIZATION AND DEODORIZATION OF EGG YOLK OIL

CROSS REFERENCE TO RELATED APPLICATION

This application claims the benefits of Taiwan application Serial No. 108148504, filed on Dec. 31, 2019, the disclosures of which are incorporated by references herein in its entirety.

BACKGROUND

Technical Field

The present invention relates to a method for decolorization and deodorization of egg yolk and a product therefrom, and particularly to a method for preparing high-purity egg yolk oil and a product therefrom.

Related Art

Egg yolk oil is the yolk lipid extracted from egg yolk, and also a traditional and ancient product that is mentioned in "Materia Medica" to have "the efficacy of treating wound inflammation, and sorehead by orally taking and external application". Some products available from Japan are said to have health care effect. If the traditional method for preparing egg yolk oil can be improved or a new egg yolk oil product can be developed, it will be helpful for the diversified use of egg products. Egg products can also be introduced to the health food field, to increase the commercial value of egg products and enhance the industry revenue.

The traditional egg yolk oil is produced by slowly cooking the egg yolk with slow fire. This is referred to as the cooking method, and mainly includes putting the raw material fresh egg yolk into a pot; stirring and frying by heating with low heat until the egg yolk is stirred evenly and equally heated to gradually becomes granular; then crushing the gradually granulated egg yolk, and allowing the water to evaporate to become large particles; continuing to stir with very low heat when the egg yolk changes from golden yellow to dark brown and starts to produce strong burnt smell and thick smoke with continuous stirring, until the particles appear sticky, and a black liquid oozes out, that is, egg yolk oil.

The yield of the cooking method is about 10%, and the yield is also related to the experience and skills of stir-frying. It is said that those with good stir-frying skills can achieve an egg yolk oil yield of 15% or more with this method. Although the production technology for egg yolk oil by cooking has a very good yield to some extent, it is difficult to control the yield and quality of the product due to the dependence on the experience and skills of stir-frying. Therefore, the method cannot be used in large-scale production on line in factories.

It is traditionally well-known for the manufacture of egg yolk oil that egg yolk oil can also be prepared by the ethanol extraction method. The method mainly includes cooking the egg yolk raw material by heating, adding 5 times of an ethanol solution, mixing thoroughly by stirring, allowing to stand for about 24 h, and then evaporating the ethanol phase, to obtain an egg yolk oil extract.

The egg yolk oil produced by the cooking method or extraction method is further filtered or centrifuged to remove the residue to obtain a more pure egg yolk oil.

However, although the egg yolk oil production technologies have a fairly good yield to some extent, the product still has a strong egg odor and appears obviously yolk yellow, so that an industrial applicability thereof is greatly limited. The problems need to be overcome.

SUMMARY

In view of this, in order to solve the above problems, the present invention provides a method for decolorization and deodorization of egg yolk oil and a product therefrom. The strong egg odor and obvious yolk yellow color of the egg yolk oil are removed by means of an ether solution and distilled water, thereby widening the industrial applications of egg yolk oil.

The present invention discloses a method for decolorization and deodorization of egg yolk oil, and the method comprises at least the following steps: providing a crude egg yolk oil; providing a first ether solution, adding the first ether solution to the crude egg yolk oil, and performing a first stirring process, to produce a first egg yolk oil mixture; providing an activated carbon, adding the activated carbon to the first egg yolk oil mixture, performing a second stirring process, and then removing the activated carbon, to produce a second egg yolk oil mixture; providing a second ether solution and distilled water, adding the second ether solution and distilled water to the second egg yolk oil mixture, and performing a third stirring process, to produce a third egg yolk oil mixture; and distilling the third egg yolk oil mixture to remove distilled water, part of the first ether solution, and part of the second ether solution, and then removing the remaining first ether solution and the remaining second ether solution by a vacuum process to produce a decolorized and deodorized egg yolk oil.

The present invention further discloses a decolorized and deodorized egg yolk oil. The decolorized and deodorized egg yolk oil is prepared through the method for decolorization and deodorization of egg yolk oil.

The decolorized and deodorized egg yolk oil of the present invention is colorless and odorless, and has an appearance that is close to the white color of the commercially available purified horse oil. That is, the decolorized and deodorized egg yolk oil of the present invention conforms to the standards for commercial sales for use.

Figure 1:
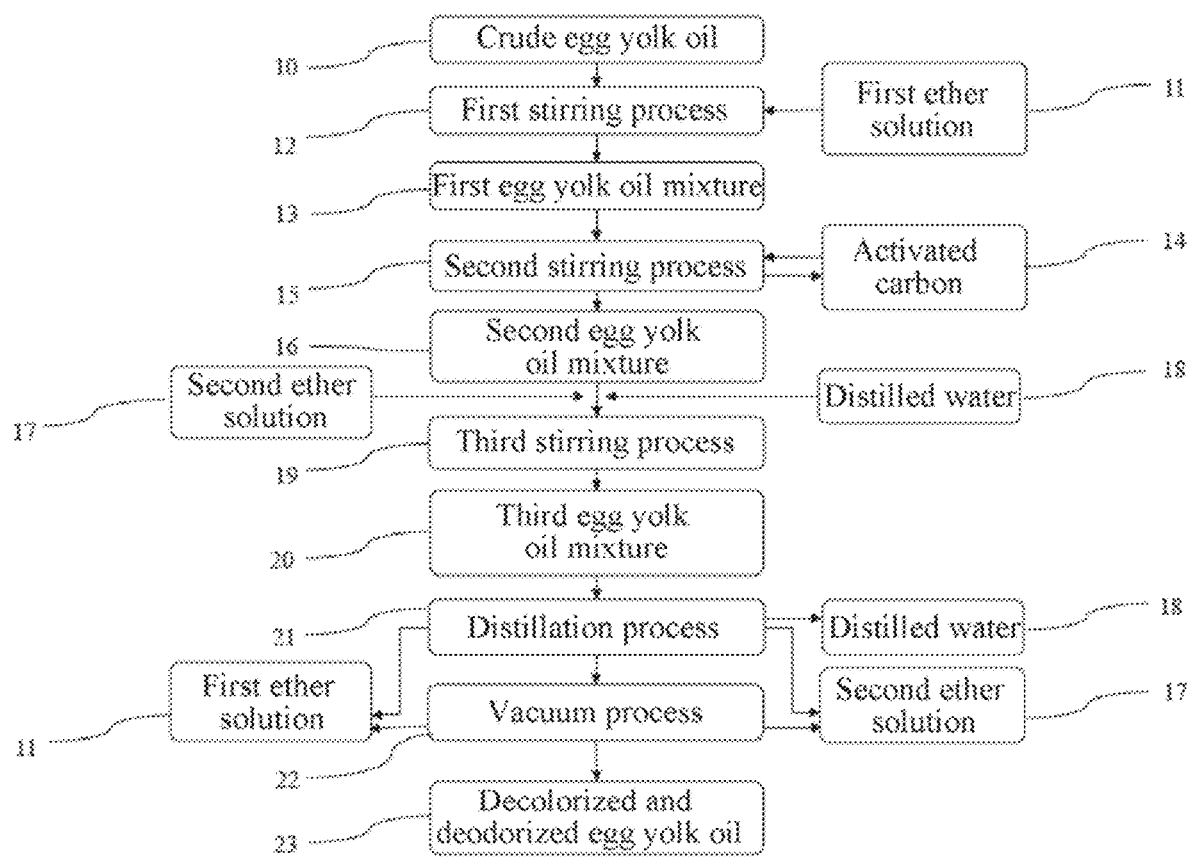
FIG. 1 is a flow chart of the method according to the present invention.

LIST OF NUMERALS 10 crude egg yolk oil
11 first ether solution
12 first stirring process
13 first egg yolk oil mixture
14 activated carbon
15 second stirring process
16 second egg yolk oil mixture
17 second ether solution
18 distilled water
19 third stirring process
20 third egg yolk oil mixture
21 distillation process
22 vacuum process
23 decolorized and deodorized egg yolk oil

DETAILED DESCRIPTION

Exemplary embodiments of the present invention will be described below with reference to the accompanying drawings. However, the present invention may alternatively include different forms, and shall not be interpreted as being limited to the embodiments set forth herein. More specifically, these embodiments are provided for completely disclosing the present invention and will fully convey the scope of the present invention to those skilled in the art.

Hereinafter, the method for decolorization and deodorization of egg yolk oil according to the embodiments of the present invention will be described in detail.

FIG. 1 is a flow chart of the method according to the present invention. Referring to FIG. 1, the present invention discloses a method for decolorization and deodorization of egg yolk oil, and the method includes at least the following steps: providing a crude egg yolk oil 10; providing a first ether solution 11, adding the first ether solution 11 to the crude egg yolk oil 10, and performing a first stirring process 12, to fully mix the first ether solution 11 and the crude egg yolk oil 10 to produce a first egg yolk oil mixture 13; a decolorization step including: providing an activated carbon 14 that can be made into granules, strips or flakes to increase the contact reaction area of the activated carbon 14, adding the activated carbon 14 to the first egg yolk oil mixture 13, performing a second stirring process 15 to fully mix the activated carbon 14 and the first egg yolk oil mixture 13 and allow the activated carbon 14 to fully adsorb the color of the first egg yolk oil mixture 13, and then removing the activated carbon 14 by conventional filtration, to produce a second egg yolk oil mixture 16; providing a second ether solution 17 and distilled water 18, adding the second ether solution 17 and distilled water 18 to the second egg yolk oil mixture 16, and performing a third stirring process 19, to produce a third egg yolk oil mixture 20; a deodorization step including: distilling the third egg yolk oil mixture 20 by a distillation process 21, by which the ingredients of egg odor are concentrated in distilled water 18 after distillation, and removing distilled water 18, part of the first ether solution 11, and part of the second ether solution 17; and then removing the remaining first ether solution 11 and the remaining second ether solution 17 by evacuation by a vacuum process 22 by taking advantage of the volatility of the first ether solution 11 and the second ether solution 17, to produce a decolorized and deodorized egg yolk oil. The crude egg yolk oil 10 is commercially available or can be prepared from egg yolk by a conventional method. The weight ratio of the first ether solution 11 to the crude egg yolk oil 10 is 5:1, and preferably 3:1. The first stirring process 12 is stirring in an agitation tank that may be a sample flask or a barrel, at a rotation speed of 60-155 rpm for 3-5 min. The weight ratio of the activated carbon 14 to the first egg yolk oil mixture 13 is 1:3-1:8, and preferably 1:6. The second stirring process 15 is stirring in an agitation tank that may be a sample flask or a barrel, at a rotation speed of 60-155 rpm for 3-5 min. The weight ratio of the second ether solution 17 to the second egg yolk oil mixture 16 is 5:1, and preferably 3:1. The weight ratio of the distilled water 18 to the second egg yolk oil mixture 16 is 7:1, and preferably 10:1. The third stirring process 19 is simply stirring in an agitation tank that may be a sample flask or a barrel, for example by rotating 1-2 rounds at a non-restricted speed or shaking the agitation tank for 10-60 s, so that an upper and a lower layer of liquid are still present. The distillation process 21 is distillation at a temperature of 60 to 80 degrees Celsius for 30 to 40 min, and preferably at a temperature of 60 to 70 degrees Celsius for 30 to 40 min. The vacuum process 22 is treatment under vacuum at a temperature of 20 to 50 degrees Celsius under a pressure of 5 torr for 60-120 min, and preferably at a temperature of 20 to 30 degrees Celsius under a pressure of 5 torr for 70-120 min.

The present invention further discloses a decolorized and deodorized egg yolk oil 23. The decolorized and deodorized egg yolk oil 23 is prepared through the method for decolorization and deodorization of egg yolk oil.

The present invention is illustrated by the following examples, but the invention is not limited thereto.

Comparative Example 1

A traditionally well-known technique for the manufacture of egg yolk oil was adopted. 1 g of the egg yolk raw material cooked by heating was provided, and 5 ml of an ethanol solution was added, mixed thoroughly by stirring, and allowed to stand for about 24 h. Then the ethanol phase was evaporated, to obtain a crude egg yolk oil extract, that is, the egg yolk oil in Comparative Example 1.

Comparative Example 2

A traditionally well-known technique for the manufacture of egg yolk oil was adopted. 1 g of an additional egg yolk raw material cooked by heating was provided, and 5 ml of an ethanol solution was added, mixed thoroughly by stirring, and allowed to stand for about 24 h. Then the ethanol phase was evaporated, to obtain a crude egg yolk oil extract, that is, the egg yolk oil in Comparative Example 2.

Example 1

1 g of crude egg yolk oil that is the egg yolk oil of Comparative Example 1 was provided as a raw material, and added to a sample flask that is a 50 ml round-bottom glass flask having a specification of 27.5×57 mm (diameter× height). 5 ml of a first ether solution was provided, and added to the crude egg yolk oil. The sample flask was positioned on an electromagnetic stirrer, and then a 20 mm magnetic stirrer bar was placed in the sample flask. The stirring was performed by setting a speed of the electromagnetic stirrer at 155 rpm and a time of 4 min. This was the first stirring process. A first egg yolk oil mixture was produced after the first ether solution and the crude egg yolk oil are thoroughly mixed.

1.21 g of granular activated carbon was provided and added to the first egg yolk oil mixture, and continuously stirred with a 20 mm magnetic stirrer bar by setting a speed of the electromagnetic stirrer of 90 rpm and a time of 5 min. This was the second stirring process. After the activated carbon was thoroughly mixed with the first egg yolk oil mixture, activated carbon was removed by filtering through a screen, to produce a second egg yolk oil mixture.

5 ml of a second ether solution and 7 ml of distilled water were provided, and added to the second egg yolk oil mixture. The sample flask was stirred by shaking slightly for about 30 sec with hand. This was the third stirring process. Then the sample flask was allowed to stand to separate into an upper and a lower layer of liquid to produce a third egg yolk oil mixture.

The sample flask containing the third egg yolk oil mixture was heated. After about 20 min of heating, the third egg yolk oil mixture reached a temperature of about 70° C., and the third egg yolk oil mixture was constantly maintained at such a temperature of about 70° C. In this case, it is to be noted that the heating source should be turned on/off repeatedly to prevent the third egg yolk oil mixture from exceeding 70° C. and bursting out of the sample flask. This procedure lasted for about 20 min, during which distilled water and ether distilled out were continuously collected and removed. This was a distillation process. Subsequently, the sample flask was removed from the heating source, and left to cool at room temperature. After standing for about 10 min, the solution was poured into a separatory funnel, and the mixture of water and egg yolk oil was separated with the separatory funnel. The separated egg yolk oil mixture was collected in a sample flask.

Then, the sample flask was fitted on a vacuum concentrator (Model N-1100 series vacuum concentrator), and treated under vacuum at a temperature of about 35° C. under a pressure of about 5 torr for about 120 min. The first ether solution and the second ether solution are discharged and removed by evacuation. This was a vacuum process. The decolorized and deodorized egg yolk oil in the sample flask is the egg yolk oil in Example 1 of the present invention.

Example 2

1 g of crude egg yolk oil that is the egg yolk oil of Comparative Example 2 was provided as a raw material, and added to a sample flask that is a 50 ml round-bottom glass flask having a specification of 27.5×57 mm (diameter× height). 3 ml of a first ether solution was provided, and added to the crude egg yolk oil. The sample flask was positioned on anelectromagnetic stirrer, and then a 20 mm magnetic stirrer bar was placed in the sample flask. The stirring was performed by setting a speed of the electromagnetic stirrer of 70 rpm and a time of 3 min. This was the first stirring process. A first egg yolk oil mixture was produced after the first ether solution and the crude egg yolk oil are thoroughly mixed.

0.52 g of granular activated carbon was provided and added to the first egg yolk oil mixture, and continuously stirred with a 20 mm magnetic stirrer bar by setting a speed of the electromagnetic stirrer of 90 rpm and a time of 5 min. This was the second stirring process. After the activated carbon was thoroughly mixed with the first egg yolk oil mixture, activated carbon was removed by filtering through a screen, to produce a second egg yolk oil mixture.

3 ml of a second ether solution and 10 ml of distilled water were provided, and added to the second egg yolk oil mixture. The sample flask was stirred by shaking slightly for about 30 sec with hand. This was the third stirring process. Then the sample flask was allowed to stand to separate into an upper and a lower layer of liquid to produce a third egg yolk oil mixture.

The sample flask containing the third egg yolk oil mixture was heated. After about 20 min of heating, the third egg yolk oil mixture reached a temperature of about 64° C., and the third egg yolk oil mixture was constantly maintained at such a temperature of about 64° C. In this case, it is to be noted that the heating source should be turned on/off repeatedly to prevent the third egg yolk oil mixture from exceeding 70° C. and bursting out of the sample flask. This procedure lasted for about 20 min, during which distilled water and ether distilled out were continuously collected and removed. This was a distillation process. Subsequently, the sample flask was removed from the heating source, and left to cool at room temperature. After standing for about 10 min, the solution was poured into a separatory funnel, and the mixture of water and egg yolk oil was separated with the separatory funnel. The separated egg yolk oil mixture was collected in a sample flask.

Then, the sample flask was fitted on a vacuum concentrator (Model N-1100 series vacuum concentrator), and treated under vacuum at a temperature of about 25° C. under a pressure of about 5 torr for about 114 min. The first ether solution and the second ether solution are discharged and removed by evacuation. This was a vacuum process. The decolorized and deodorized egg yolk oil in the sample flask is the egg yolk oil in Example 2 of the present invention.

Detection by $^1$H NMR Spectroscopy

Figure 2:
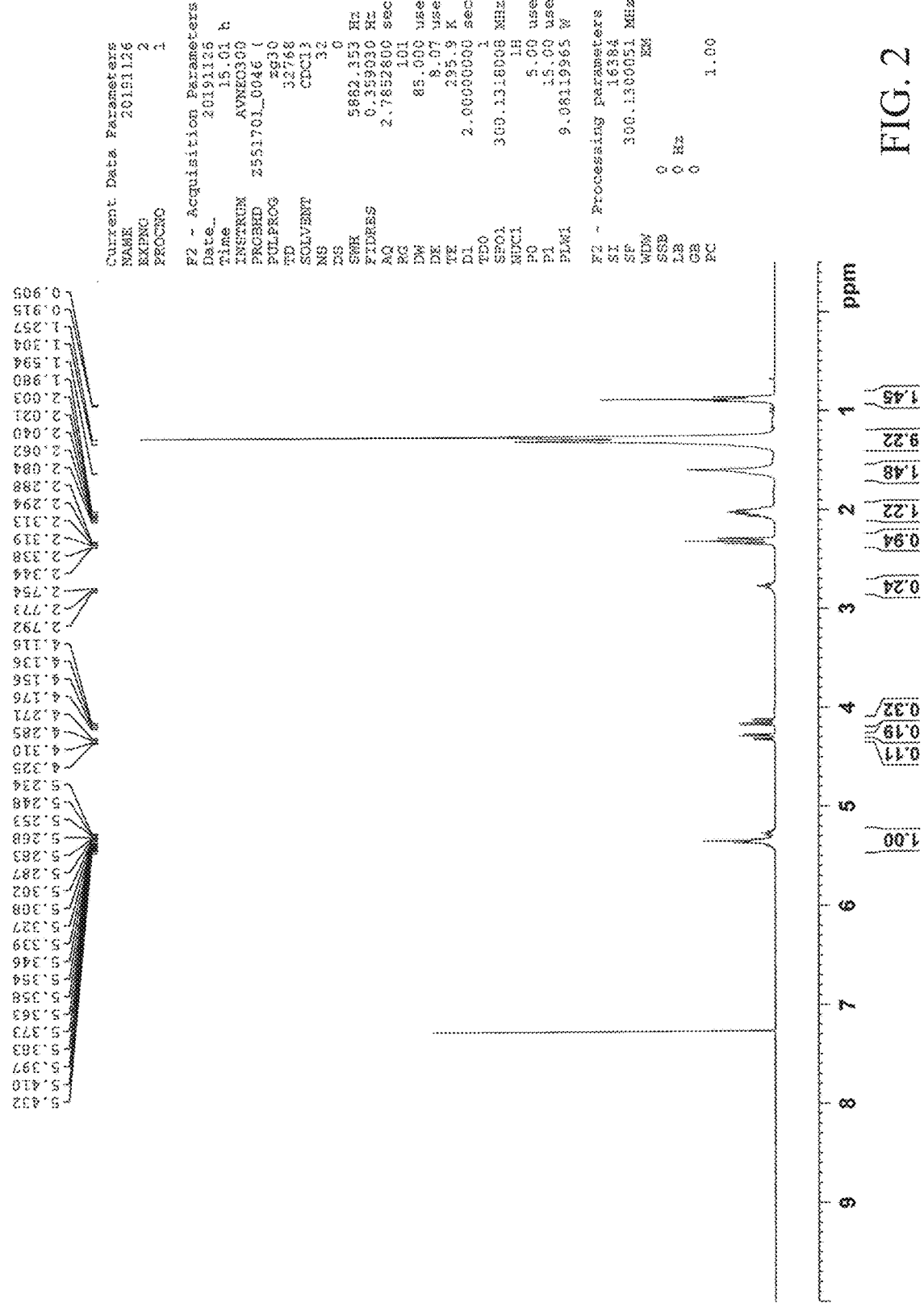
FIG. 2 is a $^1$H NMR spectrum for the detection of an egg yolk oil in Comparative Example 1.
Figure 3:
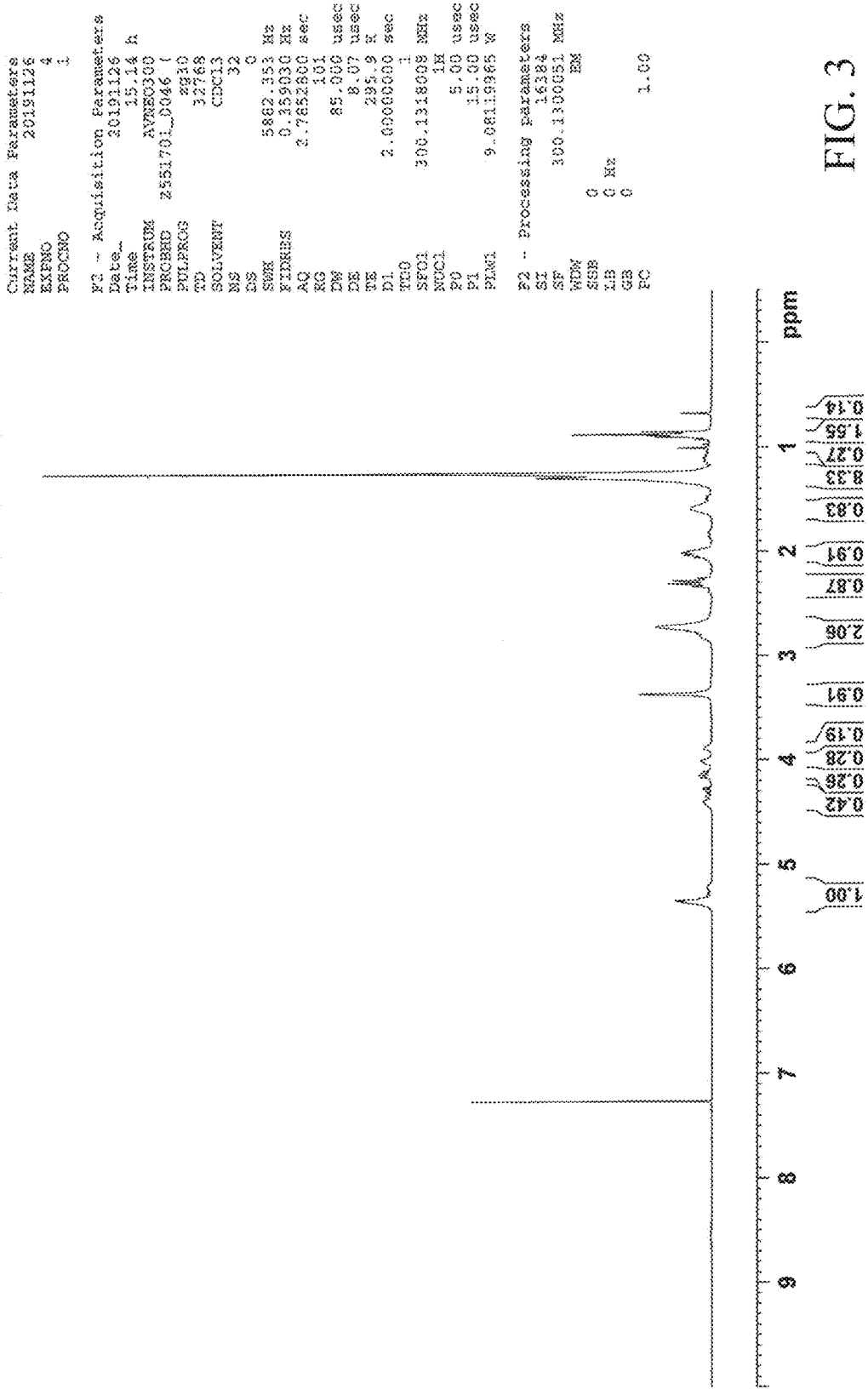
FIG. 3 is a $^1$H NMR spectrum for the detection of an egg yolk oil in Comparative Example 2.
Figure 4:
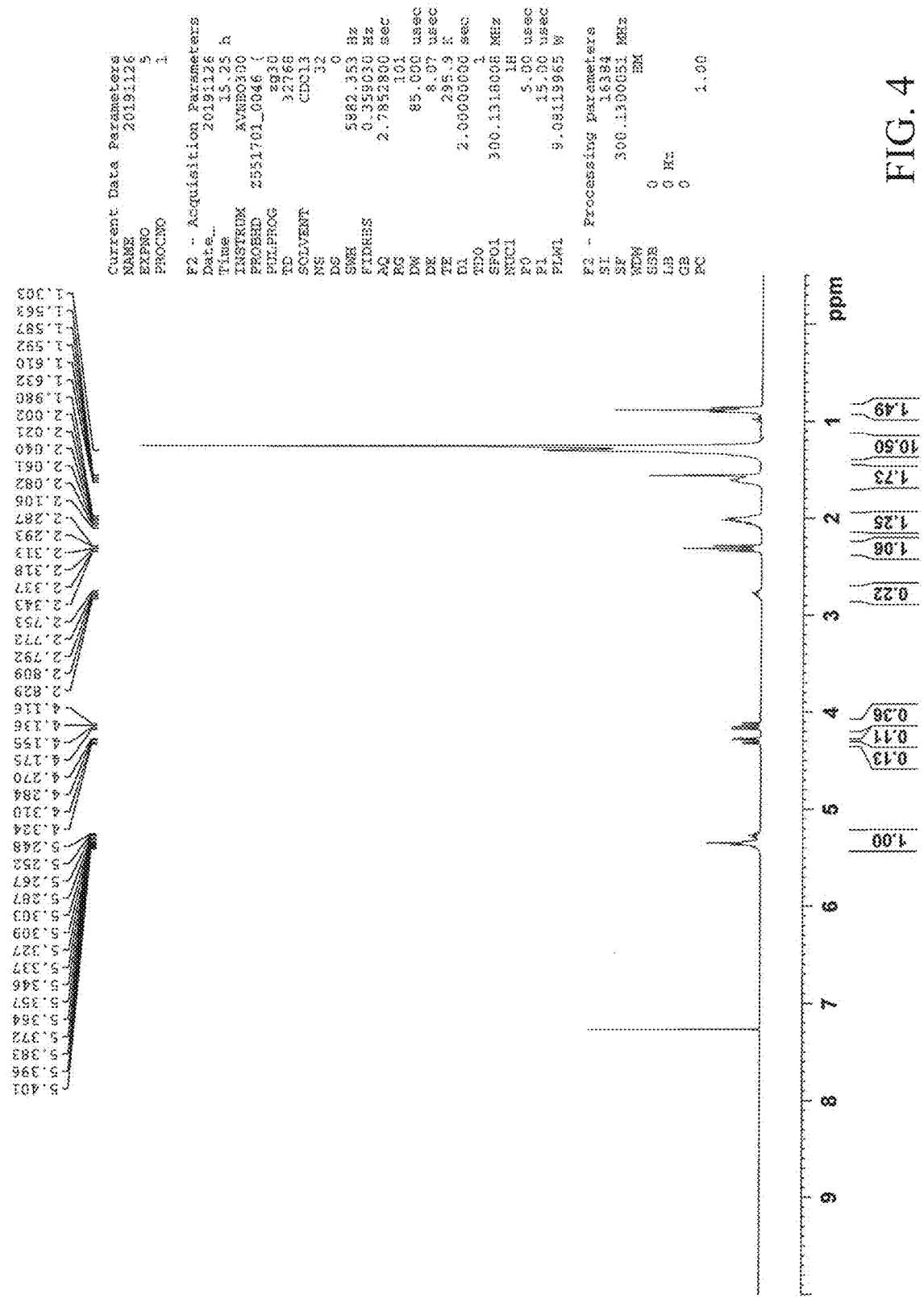
FIG. 4 is a $^1$H NMR spectrum for the detection of an egg yolk oil in Example 1.
Figure 5:
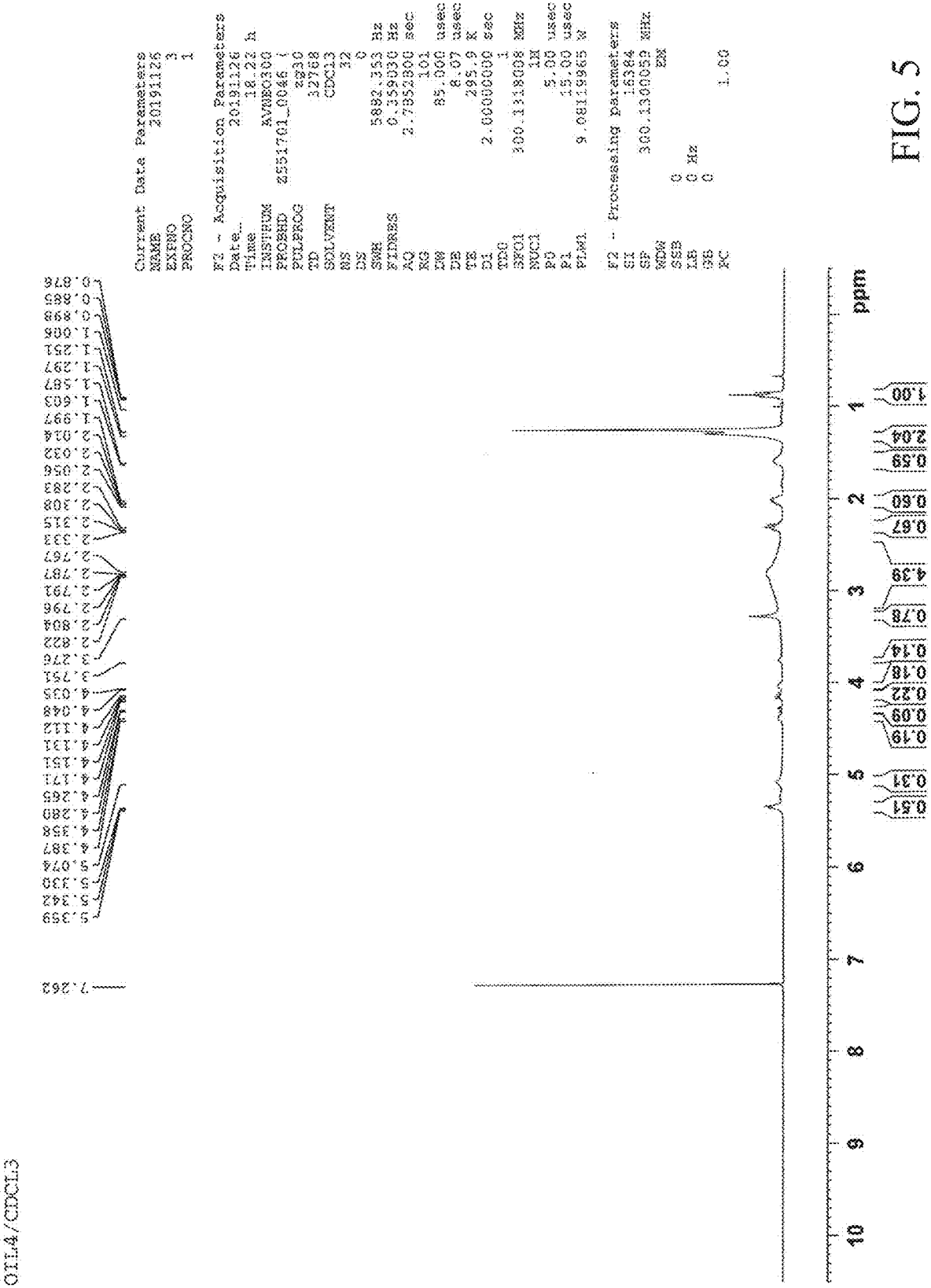
FIG. 5 is a $^1$H NMR spectrum for the detection of an egg yolk oil in Example 2.
Figure 6:
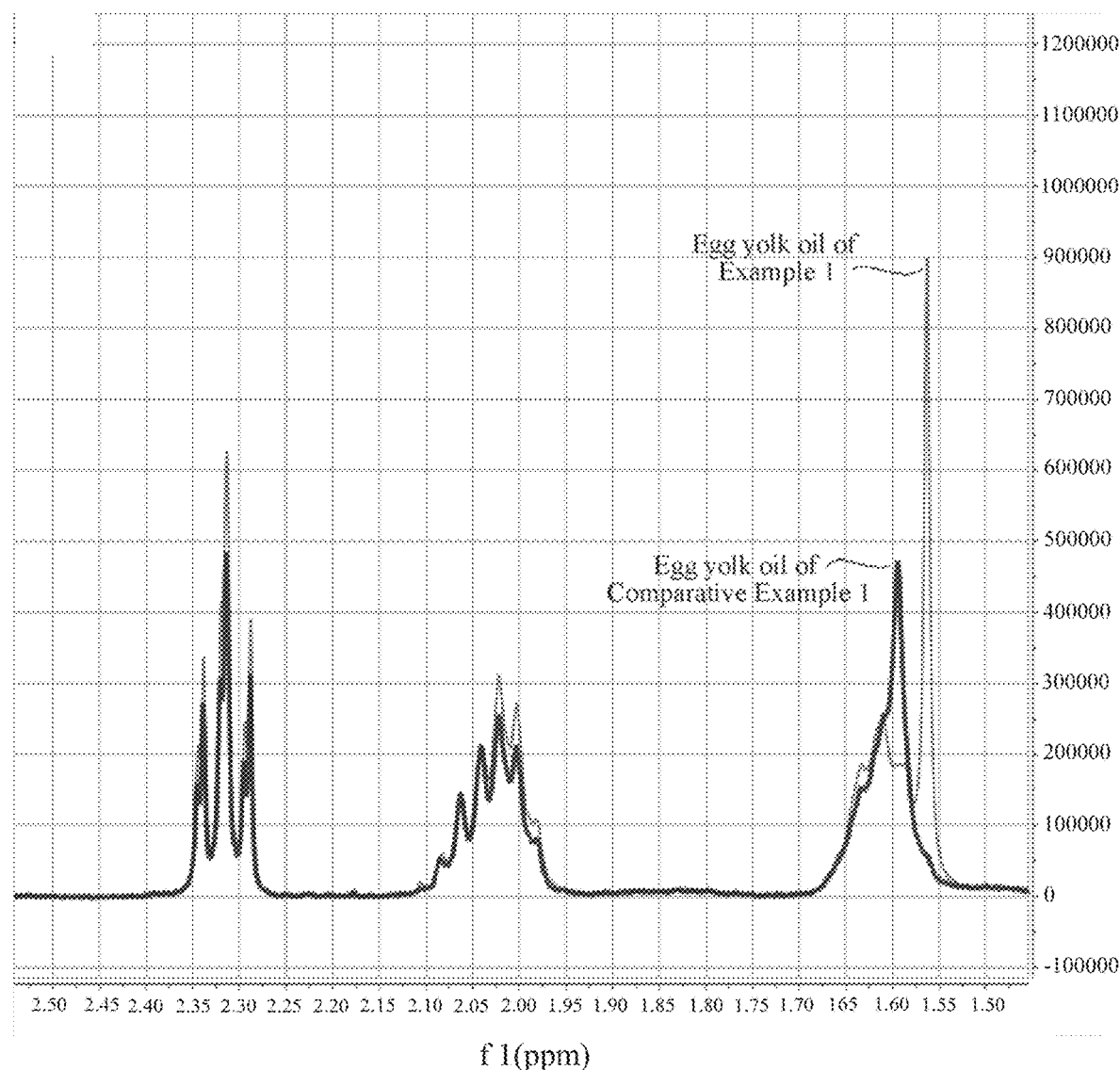
FIG. 6 shows comparison of $^1$H NMR spectra for the detection of egg yolk oils in Example 1 and Comparative Example 1.
Figure 7:
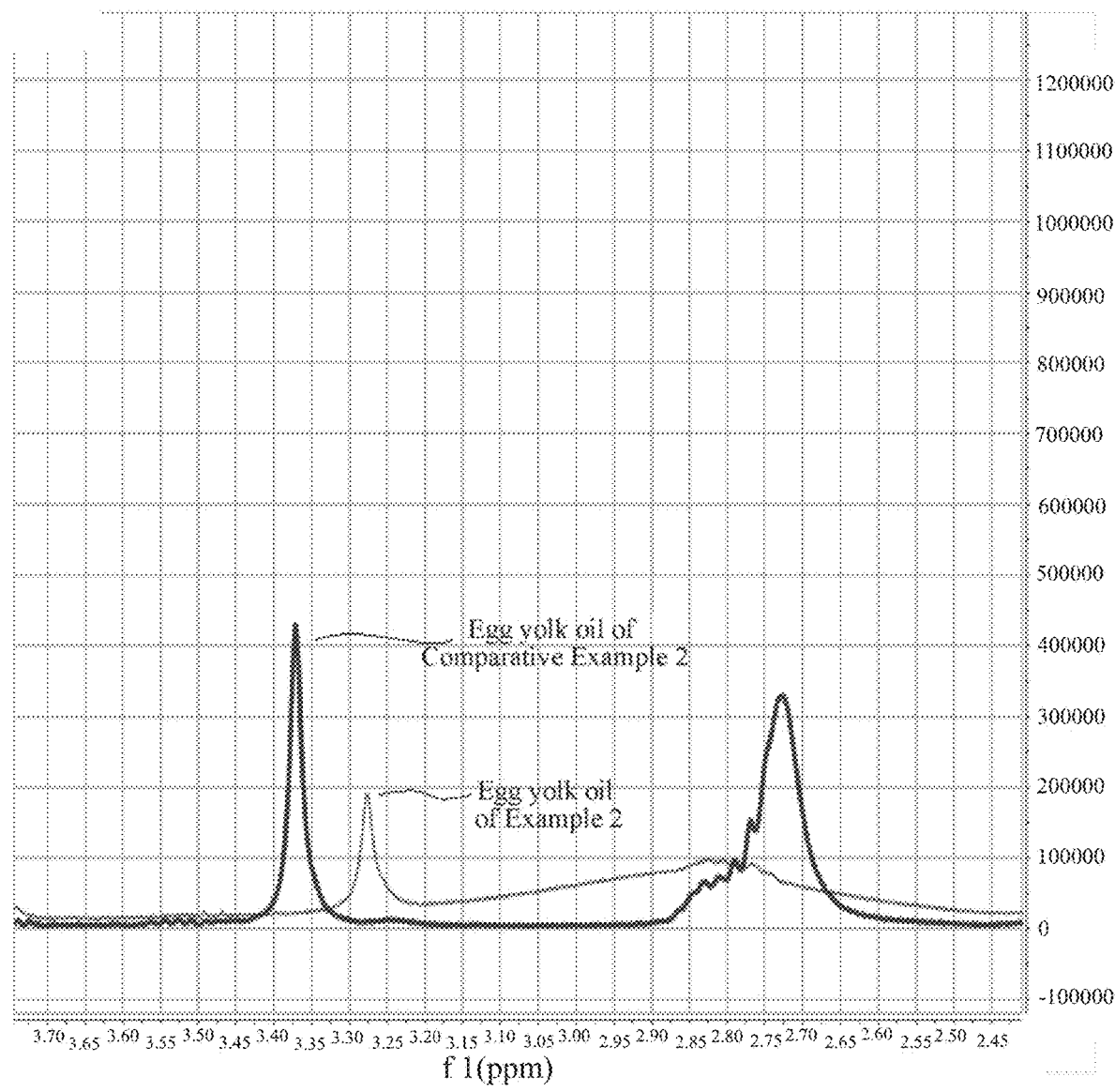
FIG. 7 shows comparison of $^1$H NMR spectra for the detection of egg yolk oils in Example 2 and Comparative Example 2.

The egg yolk oil of Comparative Example 1, the egg yolk oil of Comparative Example 2, the egg yolk oil of Example 1, and the egg yolk oil of Example 2 were respectively detected by $^1$H NMR spectroscopy. FIG. 2, FIG. 3, FIG. 4, FIG. 5, FIG. 6, and FIG. 7 are obtained. FIG. 2 is a $^1$H NMR spectrum for the detection of an egg yolk oil in Comparative Example 1. FIG. 2 is a $^1$H NMR spectrum for the detection of an egg yolk oil in Comparative Example 1. FIG. 3 is a $^1$H NMR spectrum for the detection of an egg yolk oil in Comparative Example 2. FIG. 4 is a $^1$H NMR spectrum for the detection of an egg yolk oil in Example 1. FIG. 5 is a $^1$H NMR spectrum for the detection of an egg yolk oil in Example 2. FIG. 6 shows comparison of $^1$H NMR spectra for the detection of egg yolk oils in Example 1 and Comparative Example 1. FIG. 7 shows comparison of $^1$H NMR spectra for the detection of egg yolk oils in Example 2 and Comparative Example 2.

It can be found through comparison of FIG. 2 and FIG. 4 that the 2nd to 4th peaks from the right side in FIG. 2 and in FIG. 4 are different. The comparison in FIG. 6 shows that the egg yolk oil of Comparative Example 1 differs in composition from that of the egg yolk oil of Example 1, indicating that some components are definitely removed from the egg yolk oil of Example 1.

It can be found through comparison of FIG. 3 and FIG. 5 that the 3rd to 5th peaks from the right side in FIG. 3 and in FIG. 5 are different. The comparison in FIG. 7 shows that the egg yolk oil of Comparative Example 2 differs in composition from that of the egg yolk oil of Example 2, indicating that some components are definitely removed from the egg yolk oil of Example 2.

Verification of the Effectiveness of the Decolorization Step

Figure 8:
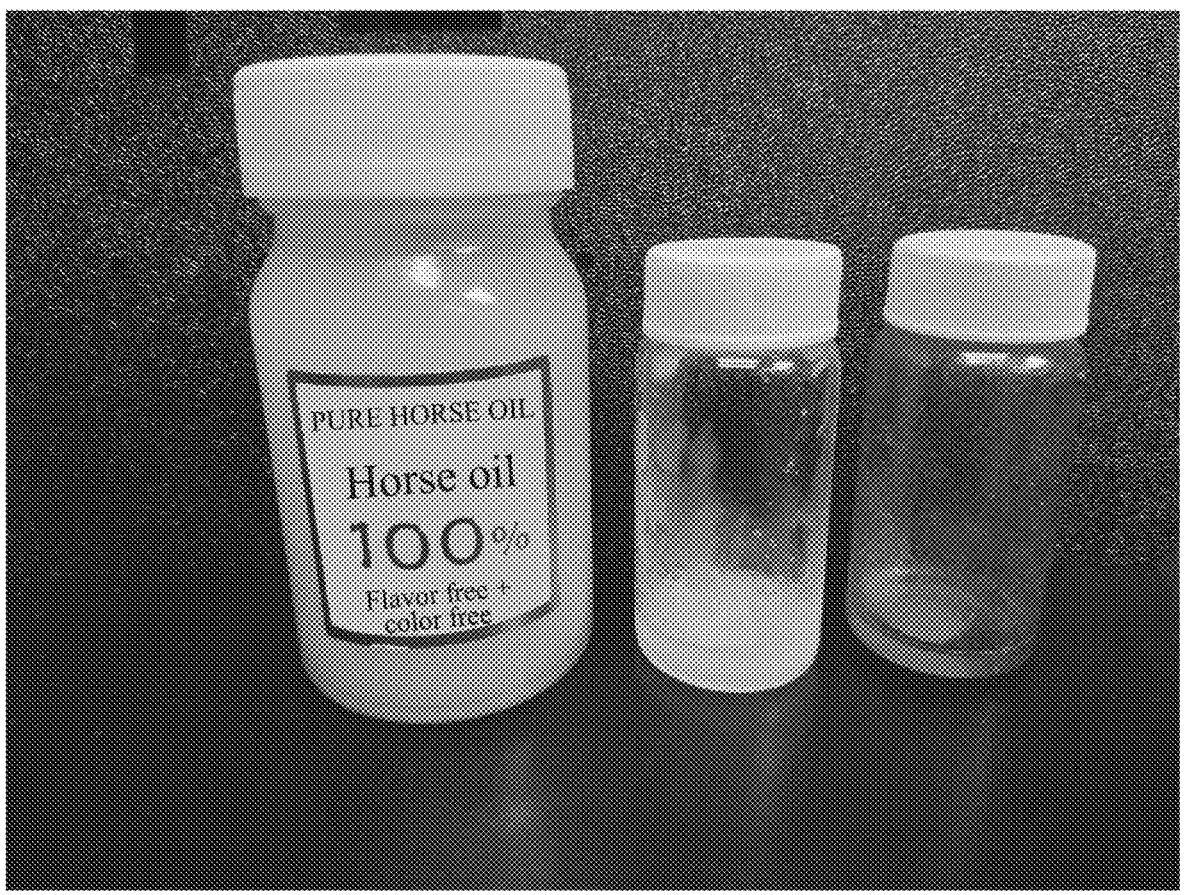
FIG. 8 shows comparison of the colors of the egg yolk oils in Example 1 and Comparative Example 1 with horse oil.

FIG. 8 shows comparison of the colors of the egg yolk oils in Example 1 and Comparative Example 1 with horse oil. The product on the left of FIG. 8 is commercially available purified horse oil, the product in the middle of FIG. 8 is the egg yolk oil of Example 1, and the product on the right of FIG. 8 is the egg yolk oil of Comparative Example 1. The egg yolk oil is visually observed to have obviously a white color.

Verification of the Effectiveness of the Deodorization Step

The olfaction tests of the egg yolk oil of Example 1, the egg yolk oil of Comparative Example 1, the egg yolk oil of Example 2, and the egg yolk oil of Comparative Example 2 were conducted. The results show that the egg yolk oils in Comparative Example 1 and Comparative Example 2 still have strong egg odor, and the egg yolk oils in Example 1 and Example 2 are odor free.

As shown by the egg yolk oils in Example 1 and Example 2 of the present invention, the present invention can completely decolorize and deodorize the egg yolk oil.

Although the present invention is described above with reference to the foregoing preferred embodiments, the embodiments are not intended to limit the present invention. A person of ordinary skill in the art may make variations and modifications without departing from the spirit and scope of the present invention, and such equivalent replacements shall still fall within the protection scope of the present invention.

In summary, the overall combination and features of the present invention have never been seen in similar products, nor have they been disclosed before the application. Since the legal requirements of the Patent Law have been complied with, an application for this invention patent has been filed in accordance with the law.

What is claimed is:

1. A method for decolorization and deodorization of egg yolk oil, comprising at least the following steps:
   providing a crude egg yolk oil;
   providing a first ether solution, adding the first ether solution to the crude egg yolk oil, and performing a first stirring process, to produce a first egg yolk oil mixture;
   providing an activated carbon, adding the activated carbon to the first egg yolk oil mixture, performing a second stirring process, and then removing the activated carbon, to produce a second egg yolk oil mixture;
   providing a second ether solution and distilled water, adding the second ether solution and distilled water to the second egg yolk oil mixture, and performing a third stirring process, to produce a third egg yolk oil mixture; and
   removing distilled water, part of the first ether solution, and part of the second ether solution from the third egg yolk oil mixture by a distillation process, and then removing the remaining first ether solution and the remaining second ether solution by a vacuum process to produce a decolorized and deodorized egg yolk oil.

2. The method for decolorization and deodorization of egg yolk oil according to claim 1, wherein the crude egg yolk oil is derived from egg yolk through the cooking method or the ethanol extraction method.

3. The method for decolorization and deodorization of egg yolk oil according to claim 1, wherein the weight ratio of the first ether solution to the crude egg yolk oil is 5:1.

4. The method for decolorization and deodorization of egg yolk oil according to claim 1, wherein the first stirring process is stirring in an agitation tank at a rotation speed of 60-155 rpm for 3-5 min.

5. The method for decolorization and deodorization of egg yolk oil according to claim 1, wherein the weight ratio of the activated carbon to the first egg yolk oil mixture is 1:3-1:8.

6. The method for decolorization and deodorization of egg yolk oil according to claim 1, wherein the second stirring process is stirring in an agitation tank at a rotation speed of 60-155 rpm for 3-5 min.

7. The method for decolorization and deodorization of egg yolk oil according to claim 1, wherein the weight ratio of the second ether solution to the second egg yolk oil mixture is 5:1.

8. The method for decolorization and deodorization of egg yolk oil according to claim 1, wherein the weight ratio of distilled water to the second egg yolk oil mixture is 7:1.

9. The method for decolorization and deodorization of egg yolk oil according to claim 1, wherein the distillation process takes place at a temperature of 60 to 80 degrees Celsius for 30 to 40 min.

10. The method for decolorization and deodorization of egg yolk oil according to claim 1, wherein the vacuum process takes place at a temperature of 20 to 50 degrees Celsius under a pressure of 5 ton for 60 to 120 min.

11. A decolorized and deodorized egg yolk oil, prepared through the method for decolorization and deodorization of egg yolk oil according to claim 1.

* * * * *